United States Patent
Moon et al.

(10) Patent No.: US 9,304,653 B2
(45) Date of Patent: Apr. 5, 2016

(54) METHOD AND APPARATUS FOR CREATING 3D IMAGE BASED ON USER INTERACTION

(71) Applicant: SAMSUNG ELECTRONICS CO., LTD., Suwon-si (KR)

(72) Inventors: Bernard Moon, Suwon-si (KR); Se-Hoon Kim, Suwon-si (KR); Woo-sung Shim, Suwon-si (KR); Soo-chahn Lee, Seoul (KR); Han-tak Kwak, Suwon-si (KR); Myung-jin Eom, Seoul (KR); Ji-hwan Woo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 13/762,915

(22) Filed: Feb. 8, 2013

(65) Prior Publication Data

US 2013/0205248 A1     Aug. 8, 2013

(30) Foreign Application Priority Data

Feb. 8, 2012  (KR) .................. 10-2012-0012914

(51) Int. Cl.
*G06F 3/048* (2013.01)
*G06F 3/0481* (2013.01)
*G06T 11/60* (2006.01)
*G06T 7/00* (2006.01)

(52) U.S. Cl.
CPC .......... *G06F 3/04815* (2013.01); *G06T 7/0065* (2013.01); *G06T 7/0081* (2013.01); *G06T 11/60* (2013.01); *G06T 2207/20104* (2013.01)

(58) Field of Classification Search
CPC ............ H04N 13/026; H04N 13/0022; H04N 13/0239; H04N 13/0055; H04N 13/0275; H04N 13/0059; H04N 13/0452; H04N 13/0456; H04N 13/0018; H04N 2213/003; G06T 13/20; G06T 15/00; G06T 15/205; G06T 17/00; G06T 19/00; G06T 2200/04; G06T 2207/10012; G06F 3/011; G06F 3/04815; G06F 3/0482; G06F 3/0488; G06F 17/30241; G06F 17/50
See application file for complete search history.

(56) References Cited

U.S. PATENT DOCUMENTS 6,477,267 B1 * 11/2002 Richards ...................... 382/154
6,937,761 B2    8/2005 Thomas et al.
(Continued)

FOREIGN PATENT DOCUMENTS

EP    0 868 818 B1    6/2003
EP    1 298 588 A1    8/2011
(Continued)

OTHER PUBLICATIONS

Kloskowski, M., "Layers: The Complete Guide to Photoshop's Most Powerful Feature, Second Edition", Oct. 2010, Peachpit Press, pp. 11, 14, 24, 27-28, 274.*

(Continued)

*Primary Examiner* — Claudia Dragoescu
(74) *Attorney, Agent, or Firm* — Sughrue Mion, PLLC

(57) ABSTRACT

A method of creating a three-dimensional (3D) image based on user interaction, the method including receiving an input image; receiving a user input; segmenting an object, which is included in the input image, based on the received user input; editing an area of the segmented object; configuring a layer for the segmented object, based on the edited area; and creating a 3D image, based on the configured layer.

29 Claims, 16 Drawing Sheets

(56) References Cited

U.S. PATENT DOCUMENTS

| | | |
|---|---|---|
| 2003/0033284 A1* | 2/2003 | Warren et al. .................... 707/1 |
| 2004/0095357 A1* | 5/2004 | Oh et al. ....................... 345/589 |
| 2010/0167385 A1* | 7/2010 | Celentano et al. ......... 435/287.1 |
| 2010/0223577 A1* | 9/2010 | Bennett et al. ................ 715/800 |
| 2010/0275160 A1* | 10/2010 | Im ................................ 715/810 |

FOREIGN PATENT DOCUMENTS

| | | | |
|---|---|---|---|
| KR | 10-2006-0036230 A | 4/2006 | |
| WO | 2010/062725 A2 | 6/2010 | |

OTHER PUBLICATIONS

Website http://layersmagazine.com/get-it-together-with-lightroom-2-and-photoshop-cs4.html, Mar. 27, 2009.*

Minglun Gong, et al., "Foreground Segmentation of Live Videos using Locally Competing 1SVMs", Computer Vision and Pattern Recognition (CVPR), 2011 IEEE Conference on Jun. 20-25, 2011, pp. 2105-2112.

* cited by examiner

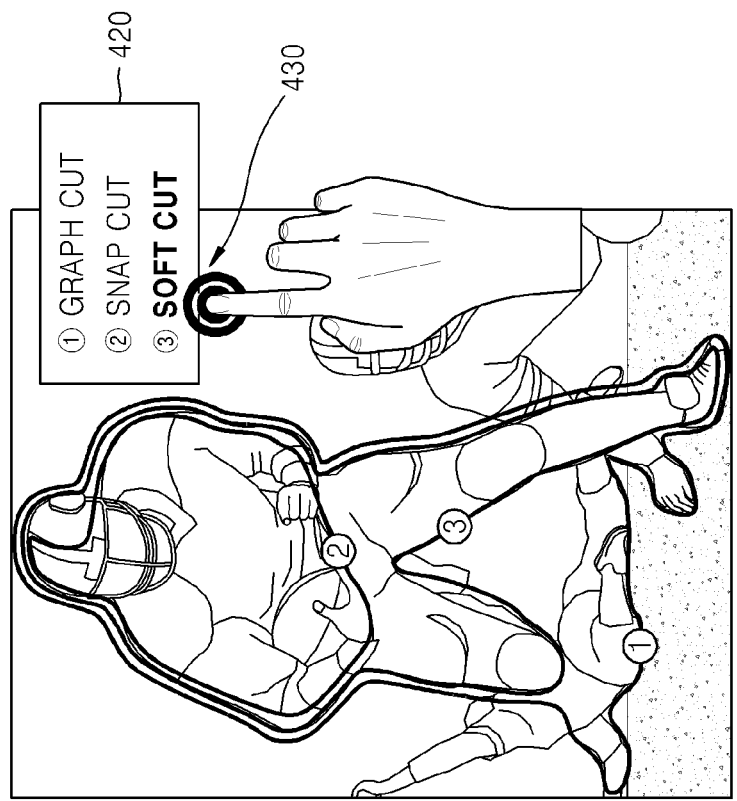
FIG. 4A
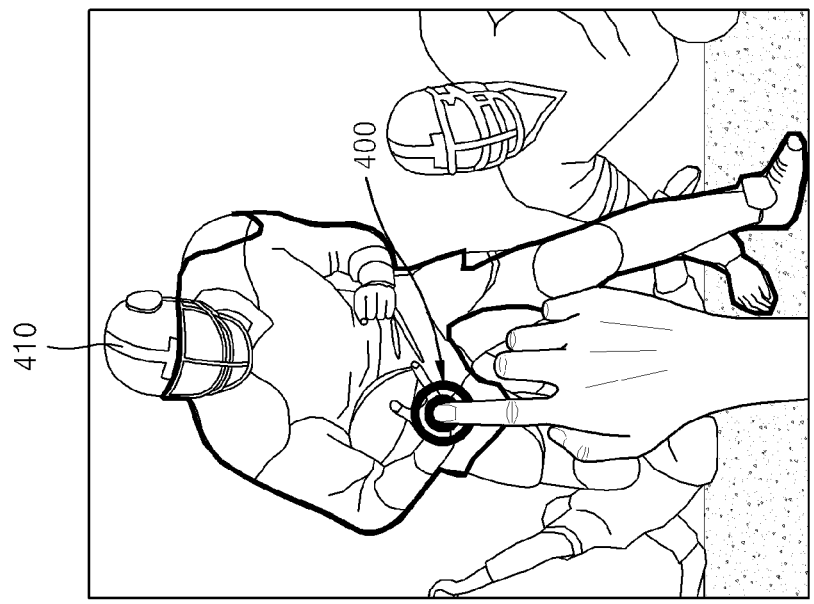

FIG. 4B
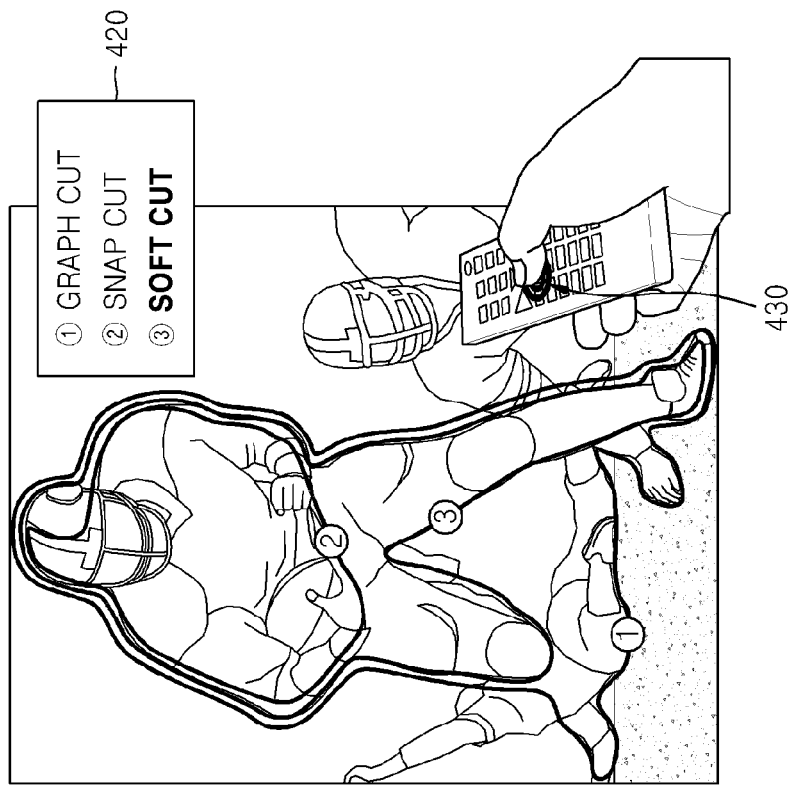
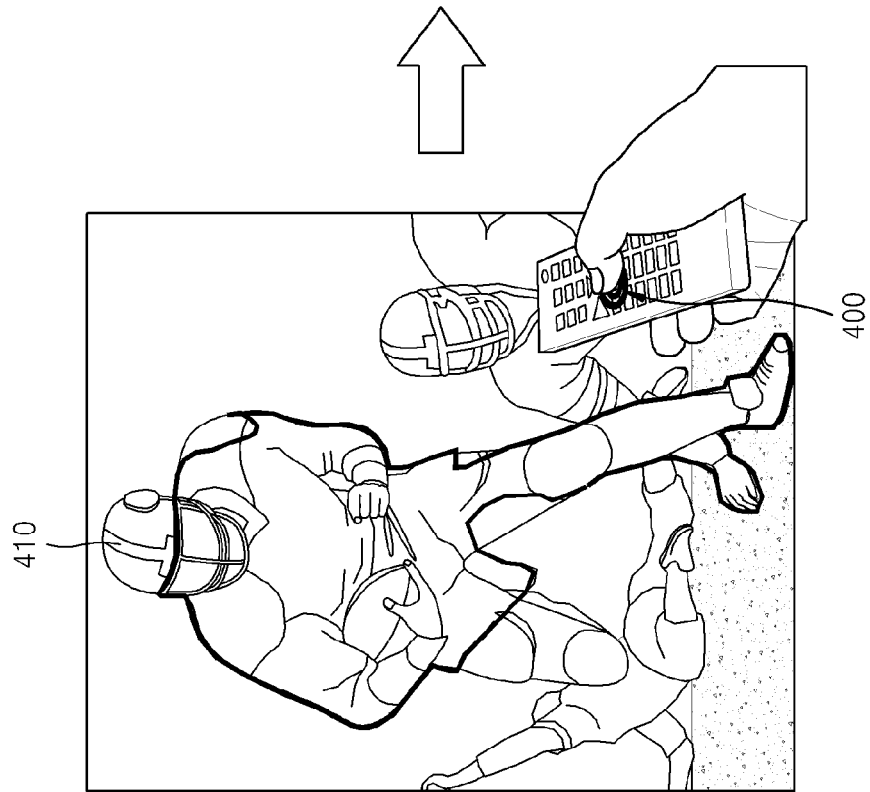

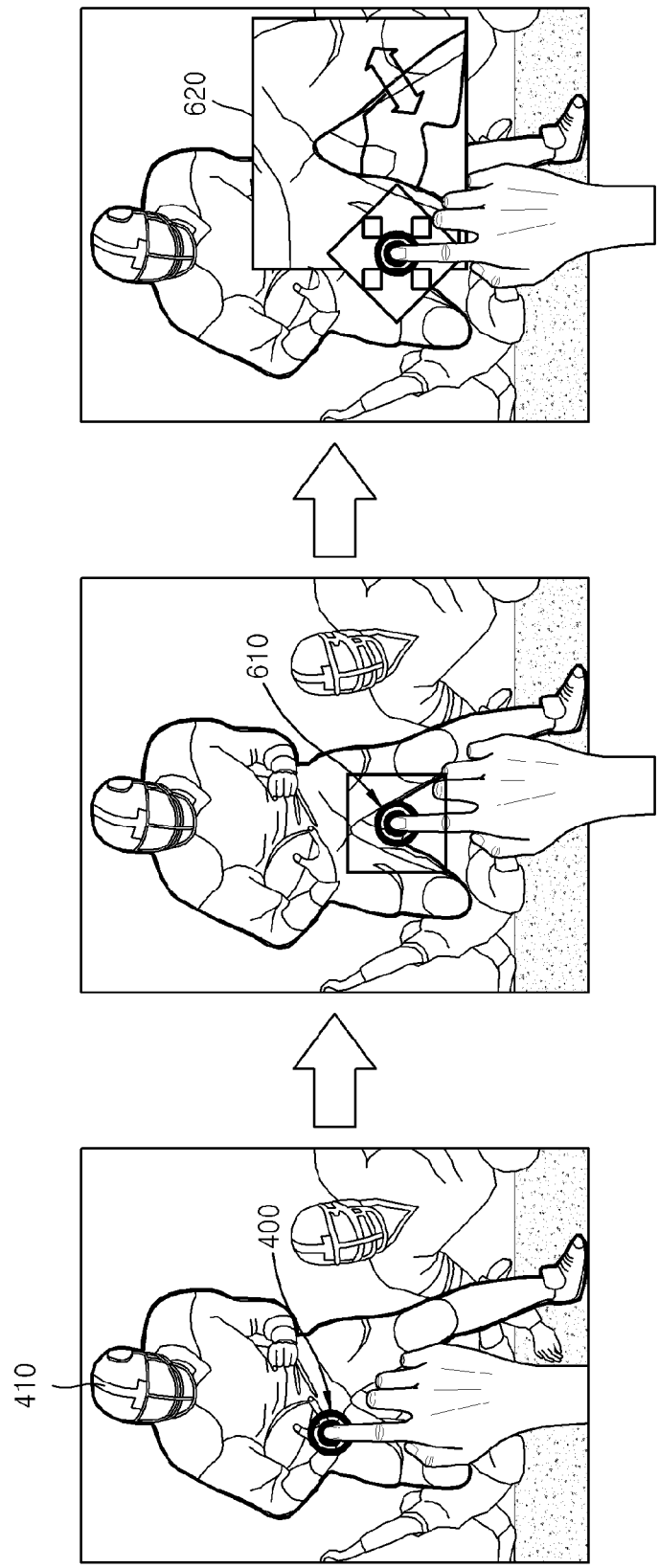

METHOD AND APPARATUS FOR CREATING 3D IMAGE BASED ON USER INTERACTION

CROSS-REFERENCE TO RELATED PATENT APPLICATION

This application claims priority from Korean Patent Application No. 10-2012-0012914, filed on Feb. 8, 2012, in the Korean Intellectual Property Office, the disclosure of which is incorporated herein in its entirety by reference.

BACKGROUND

1. Field

Methods and apparatuses consistent with exemplary embodiments relate to a method and an apparatus for creating a three-dimensional (3D) image based on user interaction, and more particularly, to a method and an apparatus for segmenting an object, creating layers, and creating a 3D image based on user interaction.

2. Description of the Related Art

Recently, due to increased user demand for image information, research into methods and apparatuses for producing and displaying three-dimensional (3D) images has been actively conducted, along with development of multimedia technology. Additionally, as most images are still produced and distributed in a 2-dimensional (2D) format, research into methods of converting 2D images into 3D images is also being performed.

In order to produce 3D images, segmentation of at least one object included in a 2D image needs to be performed first. Accordingly, it is necessary to quickly and correctly segment the at least one object included in the 2D image. Additionally, a 3D effect may be implemented by creating layers respectively for at least one segmented object, and appropriately arranging and processing the created layers in a screen on which an image is to be displayed. In such a method, 3D images may be created.

SUMMARY

One or more exemplary embodiments provide a method and an apparatus for creating a three-dimensional (3D) image based on user interaction.

According to an aspect of an exemplary embodiment, there is provided a method of creating a three-dimensional (3D) image based on user interaction, the method including: receiving an input image; receiving a user input; segmenting an object, which is included in the input image, based on the received user input; editing an area of the segmented object; configuring a layer for the segmented object, based on the edited area; and creating a 3D image, based on the configured layer.

The input image may include a plurality of frames.

The receiving of the user input may comprise receiving the user input for segmenting an object of at least one of the plurality of frames, The segmenting of the object, which is included in the input image, based on the received user input may comprise segmenting the object with respect to remaining frames from among the plurality of frames, based on the at least one of the plurality of frames in which the object is segmented; and displaying the segmented object in the plurality of frames.

The receiving of the user input for segmenting the object with respect to the at least one of the plurality of frames may include receiving the user input for segmenting the object with respect to at least one from among a first frame and a last frame from among the plurality of frames, Based on the at least one of the plurality of frames in which the object is segmented, the segmenting of the object with respect to remaining frames from among the plurality of frames may include segmenting the object with respect to remaining frames from among the plurality of frames based on the at least one from the first frame in which the object is segmented and the last frame in which the object is segmented.

The editing of the area of the segmented object may include selecting the segmented object based on the user input; providing an edit window for editing the area of the selected object; selecting a command for editing the area of the selected object, from among at least one command included in the edit window; and editing the area of the selected object, based on the selected command The at least one command may be a command for the segmented object to obtain a different border.

The editing of the area of the segmented object may include selecting the segmented object; obtaining a border of the segmented object, based on the selection; and editing the obtained border, based on the user input.

The editing of the obtained border based on the user input may include editing the border by receiving a user input of a pre-defined direction; and the pre-defined direction may include at least one from among upward, downward, left, right, and diagonal directions.

The editing of the obtained border based on the user input may include selecting a part of the border; providing a predetermined area, which includes the selected part, as an enlarged image; and editing the selected part by receiving a user input of a pre-defined direction with regard to the enlarged image.

The pre-defined direction may include at least one from among upward, downward, left, right, and diagonal directions.

The configuring of a layer for the segmented object, based on the edited area may include creating layers for respective segmented objects in the edited area; and determining an arrangement order of the created layers.

The input image may include a plurality of objects. The creating of the layers for the respective segmented objects in the edited area may include creating layers respectively in correspondence with a plurality of segmented objects in each edited area; and arranging the respective created layers according to predetermined criteria.

The predetermined criteria may include arranging the layers from front to rear on a screen according to an order in which each layer is created.

The determining of the arrangement order of the created layers may include editing the arrangement order of the respective arranged layers by receiving a user input of a pre-defined direction, and the pre-defined direction may include at least one from among upward, downward, left, right, and diagonal directions.

The determining of the arrangement order of the created layers may include providing a plurality of layer groups in which layers are arranged in different orders; and receiving a user input for selecting one of the plurality of layer groups, the arrangement order of the layers may be determined based on the user input.

The configuring of the layer for the segmented object, based on the edited area may include selecting a segmented object in the edited area; creating a virtual layer; and configuring a layer for the segmented object, by matching the selected object with the virtual layer.

The creating of the 3D image based on the configured layer may include providing a parameter value to the segmented object, based on the determined arrangement order of the layers; and converting an input image into a 3D image, based on the parameter value.

An apparatus of creating a three-dimensional (3D) image based on user interaction, the apparatus comprising: an image receiver which receives an input image; a user input receiver which receives a user input; an object segmentation unit for segmenting an object, which is included in the input image, based on the user input; an object editor which edits an area of the segmented object; a layer configuration unit for configuring layers for the segmented object, based on the edited area; and a 3D-image converter configured to create a 3D image, based on the configured layers.

The input image may comprise a plurality of frames, wherein the user input receiver receives a user input for segmenting an object with respect to at least one of the plurality of frames, and wherein the object segmenter segments the object with respect to remaining frames from among the plurality of frames, based on the at least one frame in which the object is segmented, and displays the segmented object in the plurality of frames.

The receiving of the user input for segmenting an object with respect to at least one of the plurality of frames may comprise receiving a user input for segmenting an object with respect to at least one from among a first frame and a last frame from among the plurality of frames, and wherein, based on the at least one frame in which the object is segmented, the segmenting of the object with respect to remaining frames from among the plurality of frames may comprise segmenting the object with respect to remaining frames from among the plurality of frames, based on the at least one from among the first frame in which the object is segmented and the last frame in which the object is segmented.

The object editor may comprise: an object selector configured to select the segmented object based on the user input obtained from the user input receiver; a window provider configured to provide an edit window for editing an area of the selected object; and an area editor configured to edit the area of the selected object, based on a selected command from among at least one command comprised in the edit window, wherein the user input receiver receives a user input for selecting the segmented object, and further receives a user input for selecting a command for editing the area of the selected object, from among the at least one command which is comprised in the edit window, and wherein the at least one command comprises commands for the segmented object to obtain a different border.

The object editor may comprise: an object selector configured to select the segmented object based on the user input obtained from the user input receiver; a border obtainer configured to obtain a border of the segmented object, based on the selection; and an area editor configured to edit the obtained border, based on the user input obtained from the user input receiver.

The area editor edits the border by receiving a user input of a pre-defined direction, and the pre-defined direction may comprise at least one from among upward, downward, left, right, and diagonal directions.

The user input receiver may receive a user input for selecting a part of the border, wherein the object editor may further comprise an enlarged image provider configured to provide a predetermined area, which comprises the selected part, as an enlarged image, wherein the area editor edits the selected part by receiving a user input of a pre-defined direction for the enlarged image, and wherein the pre-defined direction comprises at least one from among upward, downward, left, right, and diagonal directions.

The layer configuration unit may further comprise: a layer creator configured to create layers for each segmented object in the edited area; and an order determiner configured to determine an arrangement order of the created layers.

The input image may comprise a plurality of objects, wherein the layer creator creates layers respectively in correspondence with a plurality of segmented objects in each edited area, and wherein the order determiner arranges the created layers respectively according to predetermined criteria.

The predetermined criteria may comprise arranging the layers from front to rear on a screen according to an order in which the respective layers are created.

The order determiner may further comprise an order editor configured to edit the arrangement order of the respective arranged layers based on a user input of a pre-defined direction, which is received from the user input receiver, wherein the pre-defined direction comprises at least one from among upward, downward, left, right, and diagonal directions.

The order determiner may further comprise a layer group provider configured to provide a plurality of layer groups in which layers are arranged in different orders, wherein the user input receiver receives a user input for selecting one of the plurality of layer groups, and wherein the arrangement order of the layers is determined based on the user input.

The layer configuration unit may further comprise: a virtual layer creator configured to create a virtual layer based on the user input received from the user input receiver, when a segmented object in the edited area is selected; and an order determiner configured to determine an arrangement order of created virtual layers, wherein the order determiner further comprises a layer matching unit configured to determine an arrangement order of the virtual layers by matching the selected object with the virtual layer.

The 3D image converter may further comprise: a parameter provider configured to provide a parameter value to the segmented object, based on the determined arrangement order of the layers; and an image converter configured to convert an input image into a 3D image, based on the parameter value.

The border may be emphasized using at least one from among a dotted line, a solid line, and different colors.

The parameter value may numerically express a viewpoint of a user with respect to the segmented object.

A non-transitory computer-readable storage medium having stored thereon a computer program may perform aspects of the methods described above.

BRIEF DESCRIPTION OF THE DRAWINGS

The above and other features of exemplary embodiments will become more apparent with reference to the attached drawings in which:

FIGS. 4A and 4B illustrate an example of editing the area of the segmented object, according to an exemplary embodiment;

FIG. 6 illustrates another example of editing the area of the segmented object, according to an exemplary embodiment;

DETAILED DESCRIPTION

Terms used herein will be briefly described, and exemplary embodiments will be described in detail below.

General and widely-used terms have been employed herein, in consideration of functions provided in the present invention, and may vary according to an intention of one of ordinary skill in the art, a precedent, or emergence of new technologies. Additionally, in some cases, an applicant may arbitrarily select specific terms and in such a case, the applicant will provide the meaning of the terms in the description of the exemplary embodiments. Accordingly, it will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module', mean entities for processing at least one function or operation. These entities may be implemented by hardware, software, or a combination of hardware and software.

Exemplary embodiments will now be described more fully with reference to the accompanying drawings. The invention may, however, be embodied in many different forms and should not be construed as being limited to the exemplary embodiments set forth herein. In the description of the exemplary embodiments, certain detailed explanations of the related art are omitted when it is deemed that they may unnecessarily obscure the essence of the invention. Like numbers refer to like elements throughout the description of the figures.

Figure 1:
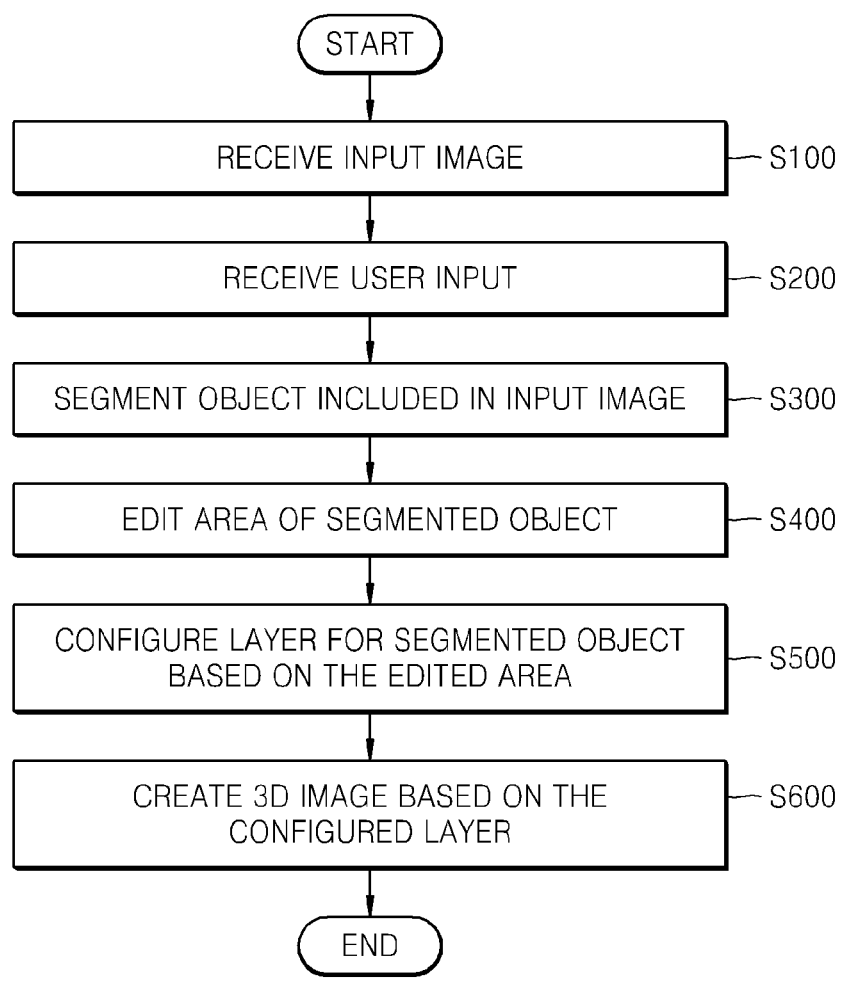
FIG. 1 is a flowchart illustrating a method of creating a three-dimensional (3D) image based on user interaction, according to an exemplary embodiment.

FIG. 1 is a flowchart illustrating a method of creating a three-dimensional image (3D) image based on user interaction, according to an exemplary embodiment.

According to an exemplary embodiment, the user interaction may comprise manipulation by a user.

The method of creating a 3D image based on user interaction, according to an exemplary embodiment, may include receiving an input image in operation S100, receiving a user input in operation S200, segmenting an object, which is included in the input image, based on the received user input in operation S300, editing an area of the segmented object in operation S400, configuring a layer for the segmented object based on the edited area in operation S500, and creating a 3D image, based on the configured layer, in operation S600.

The input image, according to an exemplary embodiment, may include a plurality of frames.

In operation S200, according to an exemplary embodiment, the receiving of a user input may include receiving an input from a user via a touch pad, a mouse, a remote controller, a joystick, a keypad, or the like. For example, the user input, according to an exemplary embodiment, may involve the user directly touching a touch pad, clicking a user interface (UI) by moving a cursor by using a mouse, or moving a cursor on a UI and selecting a UI element by using a joystick or a keypad.

Additionally, in operation S200, the receiving of a user input may include receiving a user input for segmenting an object with respect to at least one of the plurality of frames of the input image. For example, the receiving of a user input for segmenting an object with respect to at least one of the plurality of frames may include receiving a user input for segmenting an object with respect to at least one of first and last frames from among the plurality of frames.

In operation S300, according to an exemplary embodiment, the segmenting of the object, which is included in the input image, based on the received user input may include segmenting the object with respect to remaining frames from among the plurality of frames, based on the at least one frame in which the object is segmented, and displaying the segmented object in the plurality of frames.

For example, the segmenting of the object with respect to the remaining frames from among the plurality of frames, based on the at least one frame in which the object is segmented, may include segmenting the object with respect to the remaining frames from among the plurality of frames, based on the at least one of the first frame in which the object is segmented and the last frame in which the object is segmented. This will be described later, by referring to FIG. 2.

Figure 2:
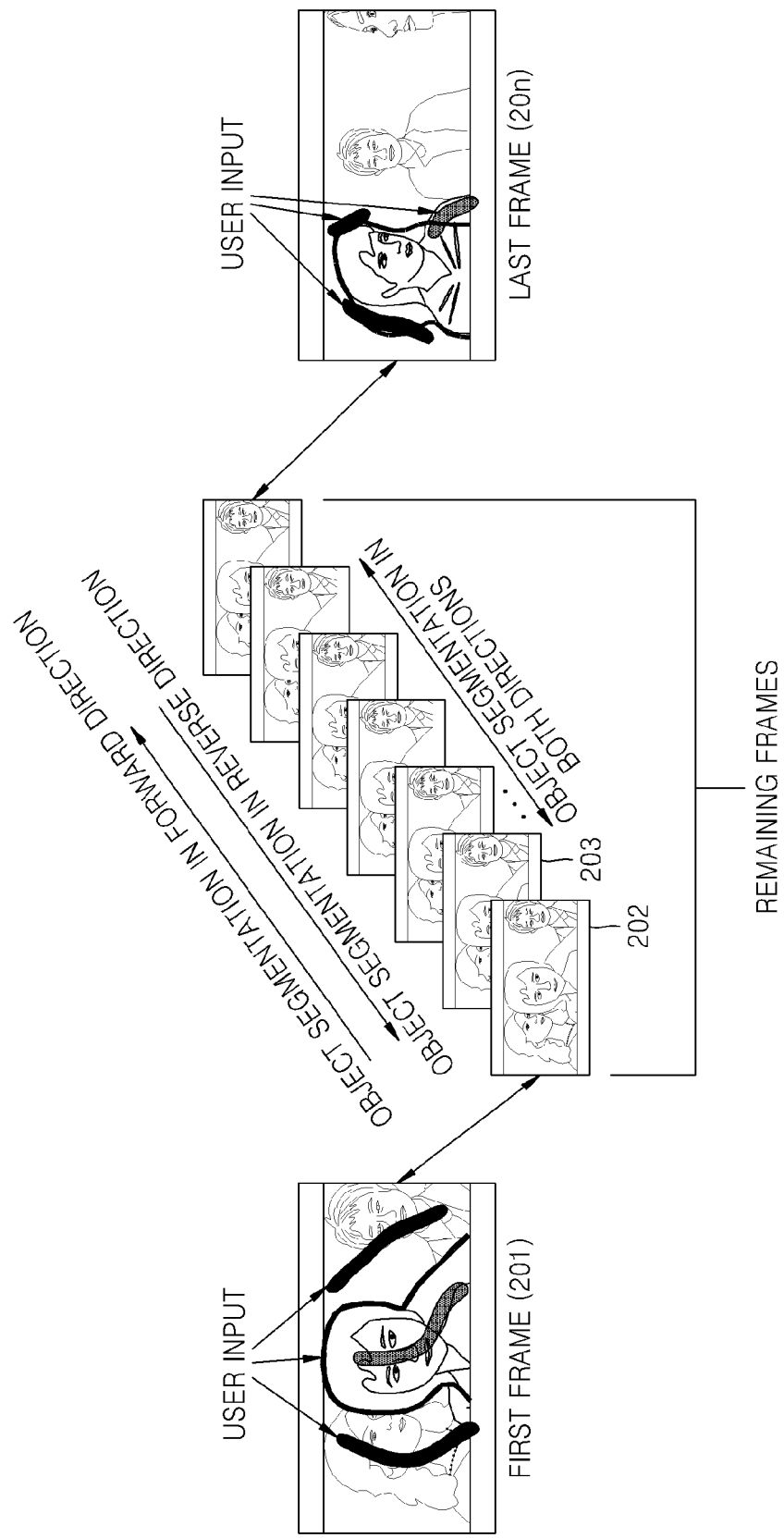
FIG. 2 illustrates an example of segmenting and displaying an object in a plurality of frames, according to an exemplary embodiment.

FIG. 2 illustrates an example of segmenting and displaying an object in the plurality of frames, according to an exemplary embodiment;

Referring to FIG. 2, at least one of a first frame 201 and a last frame 20n may receive a user input so as to segment an object. By using at least one of the first frame 201 and the last frame 20n which have received a user input for segmenting an object, object segmentation may be automatically performed on remaining frames from among the plurality of frames, for example, frames included between the first frame 201 and the last frame 20n. Object segmentation on the remaining frames may be performed as follows.

(1) Object segmentation in a forward direction: segmenting an object in an order from the first frame 201 to the last frame 20n, which received a user input for object segmentation.

(2) Object segmentation in a reverse direction: segmenting an object in a reverse direction in an order from the last frame 20*n* to the first frame 201, which received a user input for object segmentation.

(3) Object segmentation in both directions: segmenting an object in both directions, that is, forward and backward directions between the first frame 201 and the last frame 20*n*, which received a user input for object segmentation.

Object segmentation may be performed on the remaining frames according to the object segmentation in both directions.

Displaying the segmented object in the plurality of frames may include, for example, displaying the segmented object by emphasizing a border of the segmented object. For example, the border of the segmented object may be marked by using a dotted line or a thick solid line. Otherwise, the border of the segmented object may be marked by using different colors, as compared to the border of objects which are not segmented.

Figure 3:
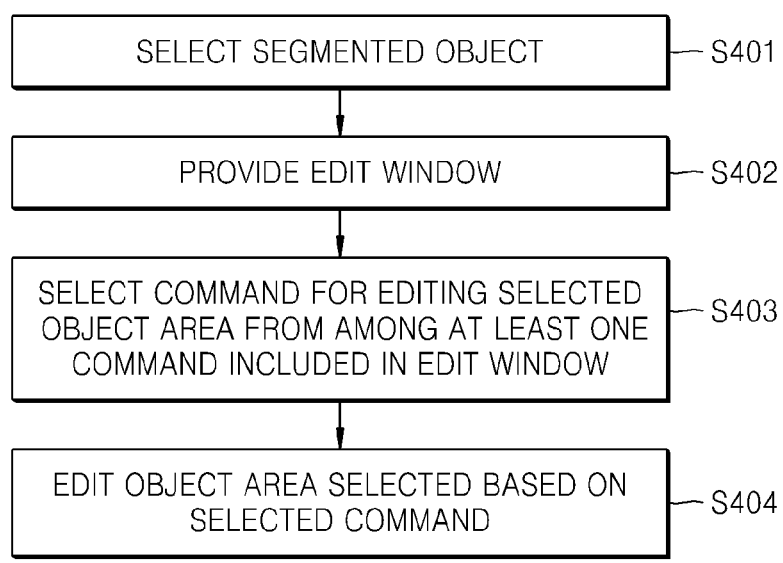
FIG. 3 is a flowchart illustrating a method of editing an area of the segmented object, according to an exemplary embodiment.

FIG. 3 is a flowchart illustrating a method of editing an area of the segmented object, according to an exemplary embodiment.

Referring to FIGS. 1 and 3, according to an exemplary embodiment, the editing of an area of the segmented object, in operation S400, includes selecting the segmented object based on a user input in operation S401, providing an edit window for editing an area of the selected object in operation S402, selecting a command for editing the area of the selected object, from among at least one command included in the edit window in operation S403, and editing the area of the selected object, based on the selected command in operation S404.

According to an exemplary embodiment, at least one command may include a command to obtain a different border with respect to the segmented object. This will be described below, by referring to FIGS. 4A and 4B.

FIGS. 4A and 4B illustrate an example of editing the area of the segmented object, according to an exemplary embodiment.

According to an exemplary embodiment, in operation S401, the segmented object may be selected at 400, based on the user input. In operation S402, an edit window 420, for editing the area of the object based on the selecting of the object in operation S401, may be provided.

For example, the receiving of the user input, as described above, may include receiving an input from a user, via a touch pad, a mouse, a remote controller, a joystick, a keypad, or the like.

The edit window 420 may include at least one command for editing the area of the selected object. The edit window 420, for example, may provide commands, such as graph cut, snap cut, and soft cut, in which objects may have various borders. For example, such respective commands and various borders, which may be added to objects, may be marked to have the same colors.

Additionally, for example as illustrated in FIG. 4B, such commands and various borders, which may be added to objects, may be numbered correspondingly to each other. Thus, user intuitiveness may be improved, and accordingly, the user may edit an area of the object more easily.

Referring back to FIGS. 4A and 4B, in operation S403, at least one command, from among a plurality of commands in the edit window 420, may be selected by the user in 430. Based on the selection, in operation S404, the selected command and a border, which may be added to the object in correspondence with the selected command, may be emphasized and displayed in the edit window 420.

FIG. 4B illustrates an example of inputting a user input by using a remote controller. The editing of the area of the segmented object is as described above.

Figure 5A:
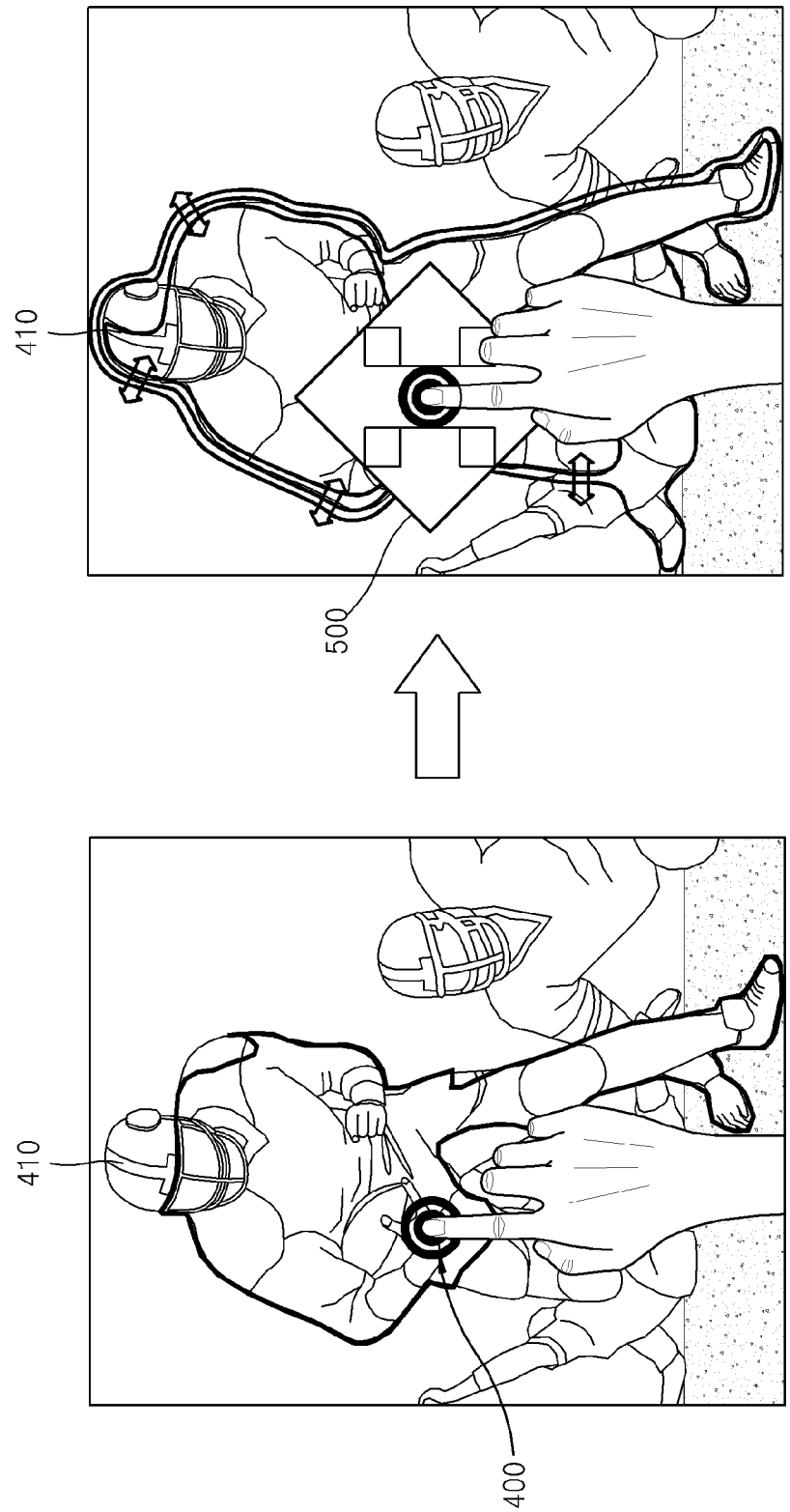
FIGS. 5A and 5B illustrate another example of editing the area of the segmented object, according to an exemplary embodiment.
Figure 5B:
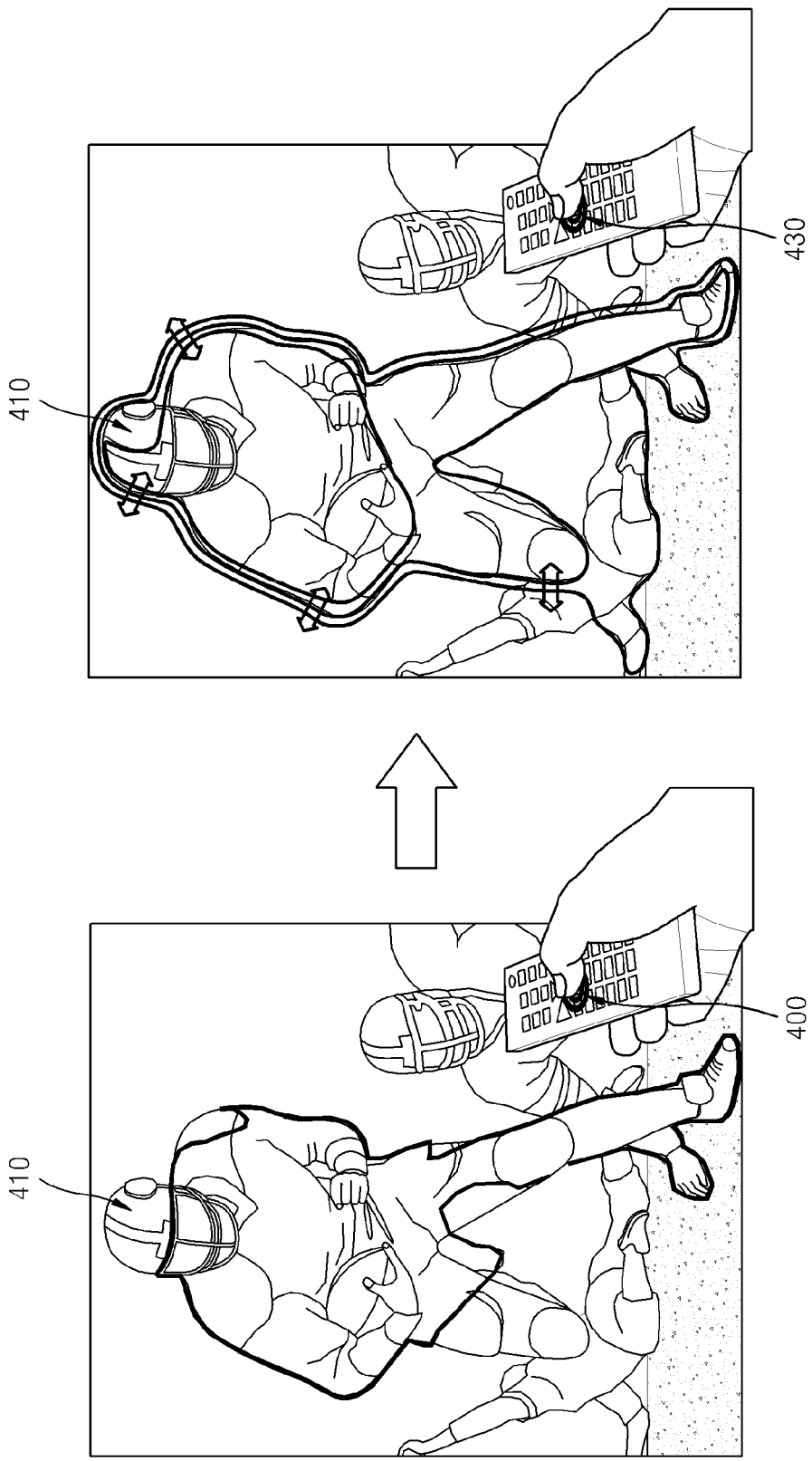

FIGS. 5A and 5B illustrate another example of editing an area of the segmented object, according to an exemplary embodiment.

According to an exemplary embodiment, in operation S400 the editing of an area of the segmented object includes selecting the segmented object, obtaining a border of the segmented object, and editing the obtained border, based on a user input.

As described above, the selecting of the segmented object may include selecting the segmented object based on a user input. Additionally, a border of the segmented object may be obtained by the selecting of the segmented object. That is, if the segmented object is selected via a user input, a current border of the selected object may be marked simultaneously.

According to an exemplary embodiment, the editing of the obtained border based on a user input may include editing the border by receiving a user input of a pre-defined direction. For example, the pre-defined direction may include at least one from among upward, downward, left, right, and diagonal directions.

For example, if the user inputs an input of a left direction with respect to the object, the obtained border of the segmented object may move to the left from a current position. Likewise, if the user inputs an input of a right diagonal direction from the current position with respect to the object, the obtained border of the segmented object may move to the right diagonal direction from the current position. As the border moves, the border of the object may increase or decrease.

FIG. 5B illustrates an example of inputting a user input by using a remote controller. The editing of the area of the segmented object is as described above.

FIG. 6 illustrates another example of editing an area of the segmented object, according to an exemplary embodiment;

According to an exemplary embodiment, the editing of the obtained border based on a user input includes selecting a part 610 of the border, providing a predetermined area, which includes the selected part 610, as an enlarged image 620, and editing the selected part 610 by receiving a user input of a pre-defined direction with regard to the enlarged image in 620. The pre-defined direction may include at least one from among upward, downward, left, right, and diagonal directions.

According to an exemplary embodiment, the selecting of a part 610 of the border may include receiving a user input for selecting a part of the border of the selected object, and obtaining a predetermined area which includes a part of the border selected by the received user input. For example, the predetermined area may include a certain form of a frame which may be formed in the shape of a polygon or a circle.

According to an exemplary embodiment, the obtained predetermined area may be provided as an enlarged image 620. For example, an enlargement ratio of an image may be pre-defined, or variably adjusted by a user input.

According to an exemplary embodiment, a part of the selected border may be edited in the enlarged image 620, by receiving a user input of a pre-defined direction with regard to an enlarged image. The editing of the border is as described above.

Figure 7:
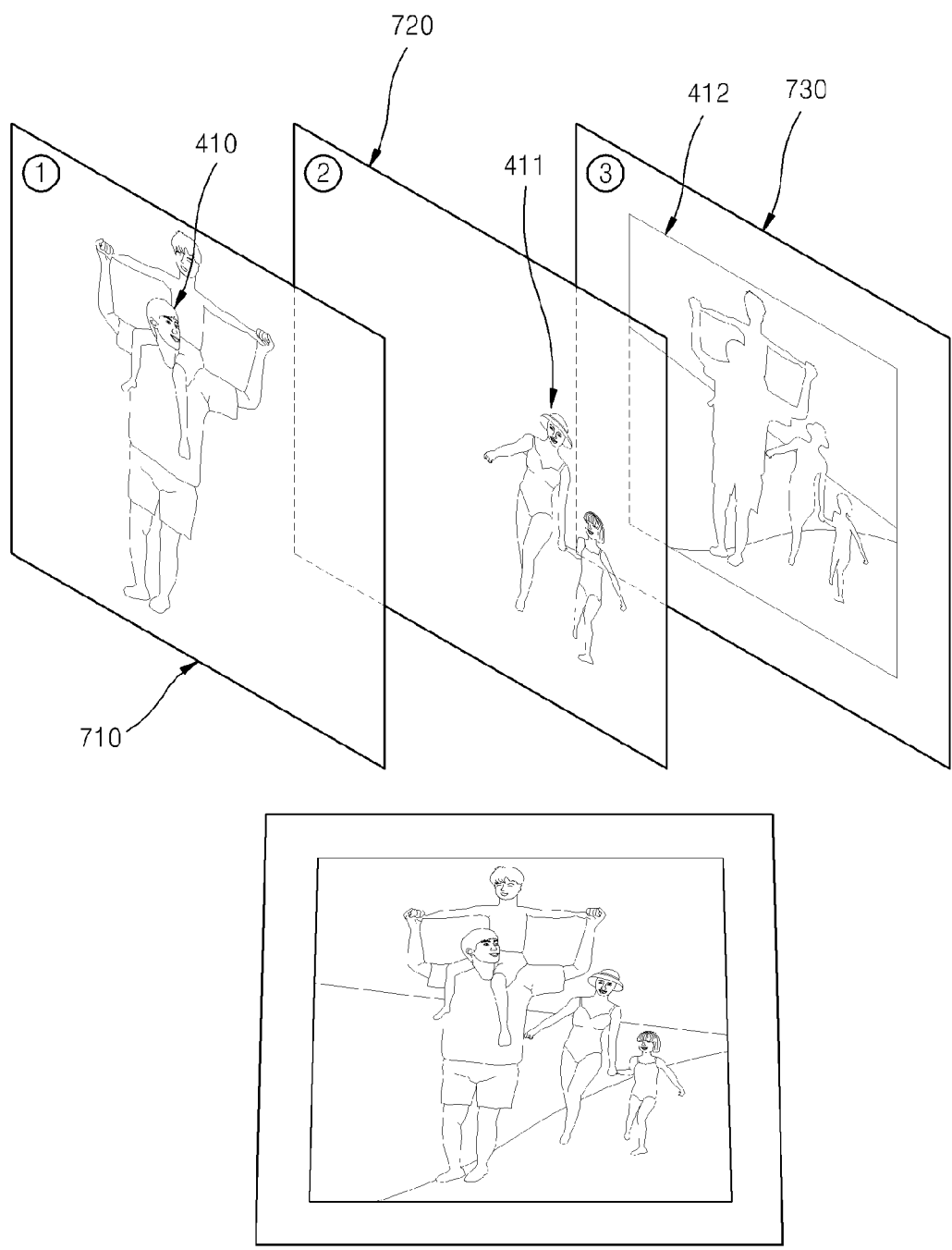
FIG. 7 illustrates an example of configuring layers of the segmented object, according to an embodiment of the present invention.

FIG. 7 illustrates an example of configuring layers of the segmented object, according to an exemplary embodiment;

According to an exemplary embodiment, in operation S500, the configuring of layers for the segmented object, based on the edited area, may include creating layers for each segmented object in the edited area, and determining an arrangement order of the created layers.

According to an exemplary embodiment, the input image may include a plurality of objects.

According to an exemplary embodiment, the creating of layers for each segmented object in the edited area may include creating respective layers in correspondence with a plurality of segmented objects in each edited area, and arranging the respective created layers according to predetermined criteria.

Referring to FIG. 7, a plurality of objects 410 through 412, which are included in an input image, may be segmented by including the border edited for each object. Layers 710 through 730 may be created respectively to correspond with the segmented plurality of objects. Additionally, for example, the same number of virtual layers may be created as that of the segmented plurality of objects. At an initial state of creating the virtual layers, each virtual layer may be in a vacant state in which no object is included.

The respective created layers may be arranged according to the predetermined criteria. For example, the predetermined criteria may include arranging the layers from front to rear on a screen, according to an order in which the layers are created. Likewise, virtual layers, created based on the number of the plurality of objects, may also be arranged from front to rear on the screen according to an order in which the virtual layers are created. The front on the screen may include a direction from the screen that is closest to a viewpoint of the user.

Additionally, respective layers may be provided with a label which represents an arrangement order. For example, a first layer on the screen may be provided with a label for indicating that it is the first layer. That is, a number '1', an English letter 'a', or a Korean consonant letter ']' may be provided. Likewise, a last layer on the screen may be provided with a label for indicating that it is the last layer.

According to an exemplary embodiment, the arrangement order of the arranged layers may be changed according to the predetermined criteria, as described above.

Figure 8:
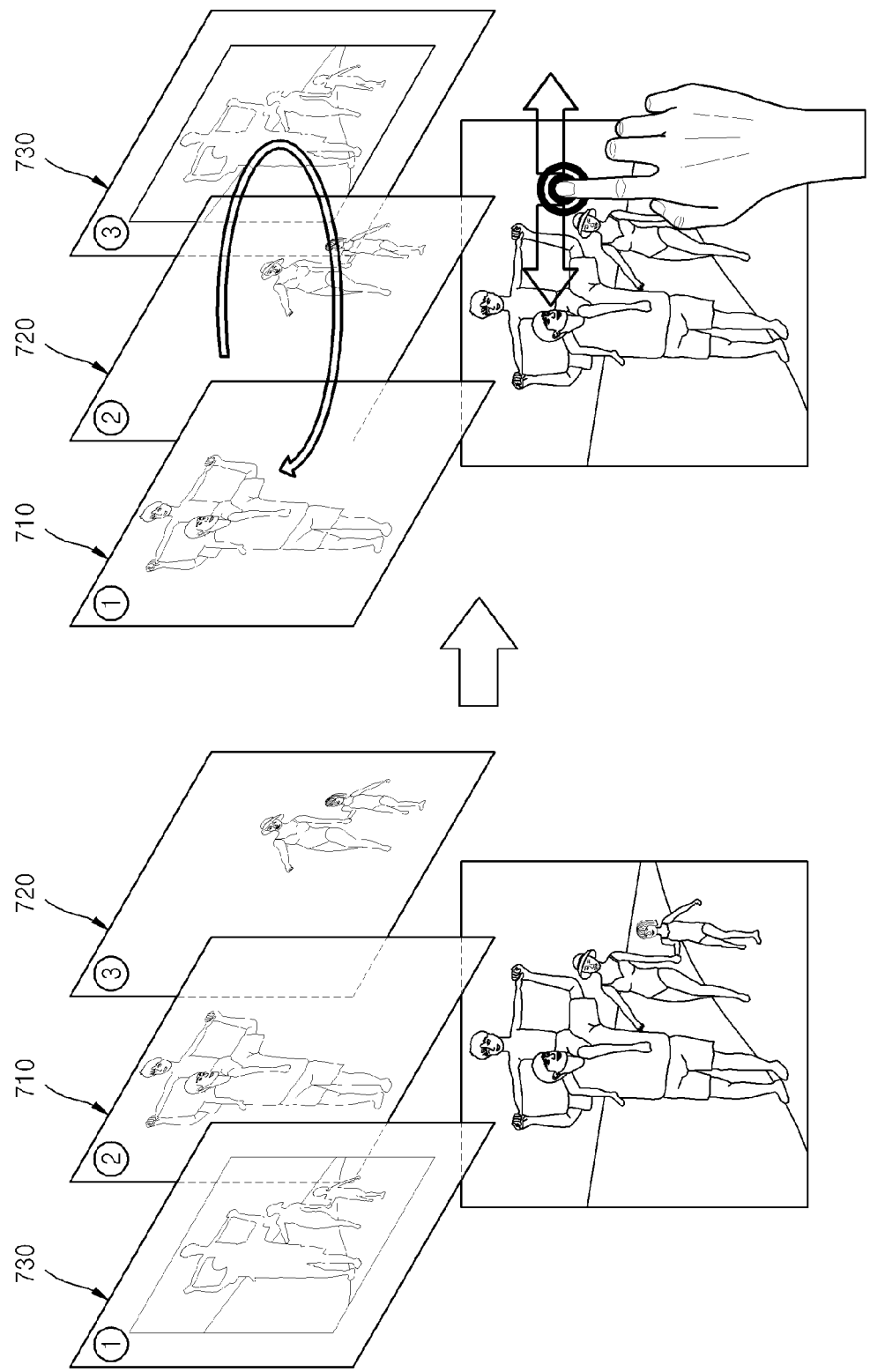
FIG. 8 illustrates an example of determining an arrangement order of the layers, according to an exemplary embodiment.

FIG. 8 illustrates an example of determining an arrangement order of the layers, according to an exemplary embodiment.

According to the present exemplary embodiment, the determining of an arrangement order of the created layers may include editing the arrangement order of the respective arranged layers by receiving a user input of a pre-defined direction. For example, the pre-defined direction may include at least one from among upward, downward, left, right, and diagonal directions.

Referring to FIG. 8, for example, a layer 730, which is to be arranged at a last position on the screen, is arranged at a first position. Then, a user may move the layer 730, which is to be arranged at the last position, through an input of a pre-defined direction.

Figure 9:
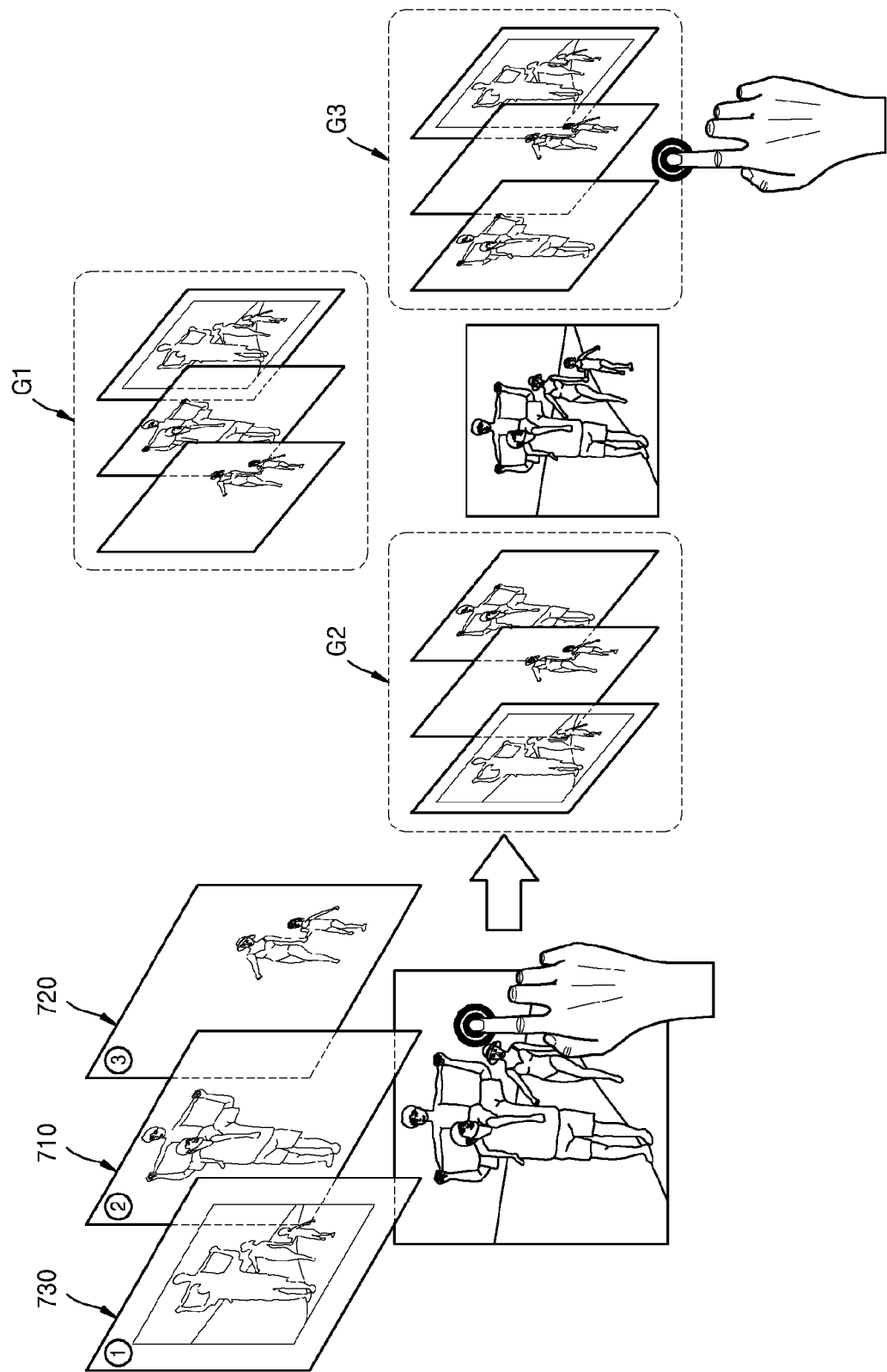
FIG. 9 illustrates another example of determining an arrangement order of the layers, according to an exemplary embodiment.

FIG. 9 illustrates another example of determining an arrangement order of the layers, according to an exemplary embodiment;

According to the present exemplary embodiment, the determining of the arrangement order of the created layers may include providing a plurality of layer groups in which respective layers are arranged in different orders, and receiving a user input for selecting one of the plurality of layer groups. The arrangement order of the layers, according to the present exemplary embodiment, may be determined based on a user input in which one of the plurality of the layer groups is selected.

Referring to FIG. 9, for example, a plurality of layer groups G1 through G3, in which the respective layers are arranged in different orders, may be provided. The different arrangement order of the layers may be selected at random. The arrangement order of the layers may be determined by a user input in which one of the plurality of groups G1 through G3 is selected. For example, as illustrated in FIG. 9, when a user selects a specific layer group G3, the arrangement order of the layers may be determined as shown in the layer group G3.

Figure 10:
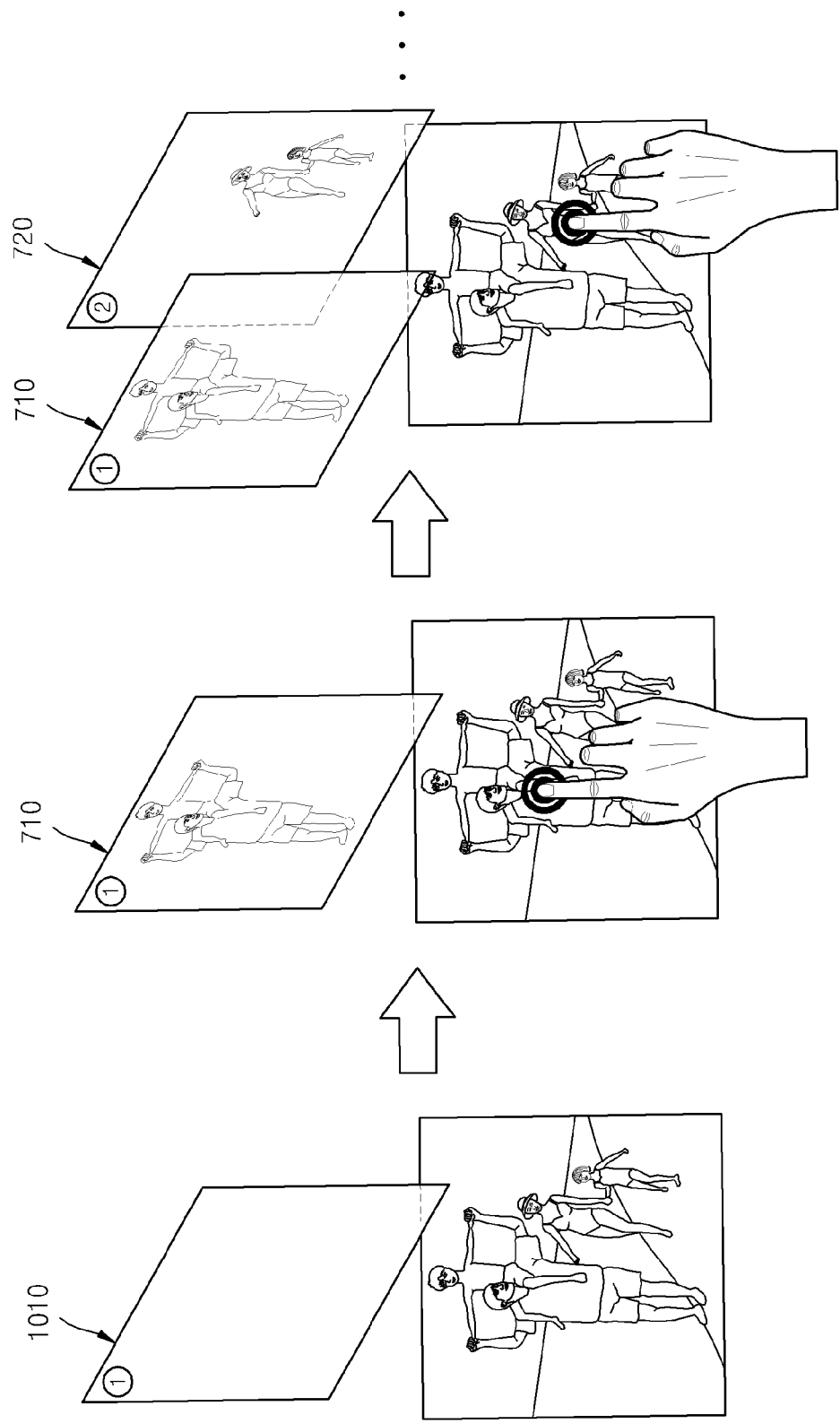
FIG. 10 illustrates another example of determining an arrangement order of the layers, according to an exemplary embodiment.

FIG. 10 illustrates another example of determining an arrangement order of the layers, according to an exemplary embodiment;

According to the present exemplary embodiment, the configuring of layers for the segmented object, based on the edited area, may include selecting a segmented object 410 in the edited area, creating a virtual layer 1010, and configuring a layer 710 for the segmented object, by matching the selected object 410 with the virtual layer 1010.

According to an exemplary embodiment, the selecting of the segmented object 410 in the edited area and the creating of the virtual layer 1010 may be executed in a certain order. That is, the virtual layer 1010 may be created after the segmented object 410 is selected, or vice versa.

Additionally, the number of the virtual layers may correspond to the number of segmented objects included in an image. For example, the virtual layers may be created, so that the number of virtual layers may correspond to the total number of segmented objects included in the image, and may be provided to a user.

Figure 11:
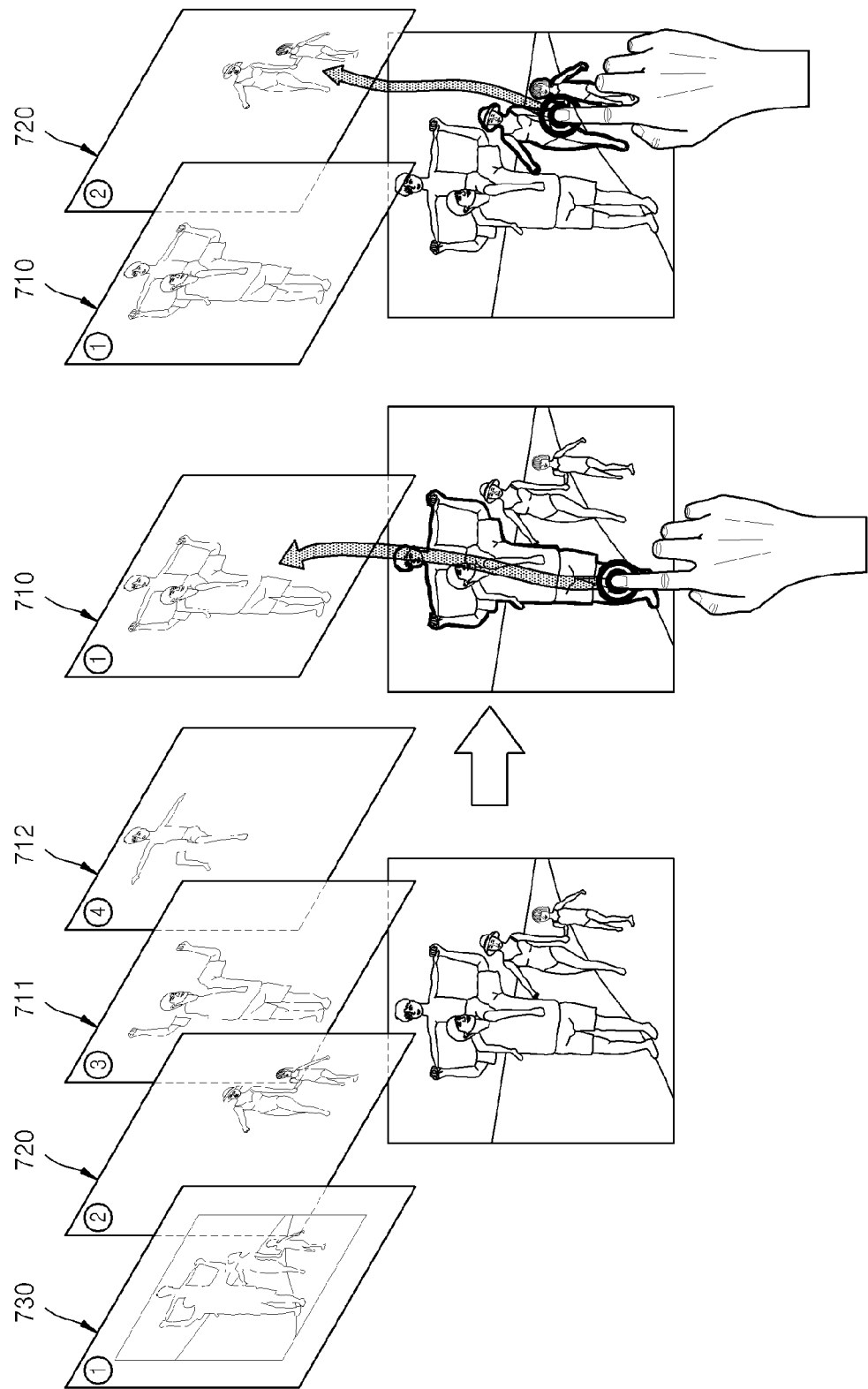
FIG. 11 illustrates another example of determining an arrangement order of the layers, according to an exemplary embodiment.

FIG. 11 illustrates another example of determining an arrangement order of the layers, according to an exemplary embodiment;

Referring to FIG. 11, a virtual layer is created, and then, an object is selected to be matched with the virtual layer. According to the present exemplary embodiment, matching a selected object 410 with a virtual layer 1010 may include selecting the object 410 and moving the selected object 410 by, for example, dragging so as to match the object 410 with the virtual layer 1010.

According to an exemplary embodiment of the present invention, the creating of the 3D image based on the configured layer, in operation S600, may include providing a parameter value to the segmented object, based on the determined arrangement order of the layers, and converting an input image into a 3D image, based on the parameter value.

According to an exemplary embodiment, the parameter value, provided to the object, is a value which numerically expresses a viewpoint of a user with respect to the object. For example, the parameter value may include a depth of an object. According to an exemplary embodiment, by providing an object with a parameter, a map or a table that represents matching between the object and the parameter may be obtained.

Additionally, according to an exemplary embodiment, an input image may be converted into a 3D image by using various methods of providing a 3D effect such as a hole-filling method.

The above-described processes may be respectively executed for a plurality of frames included in an input image.

Figure 12:
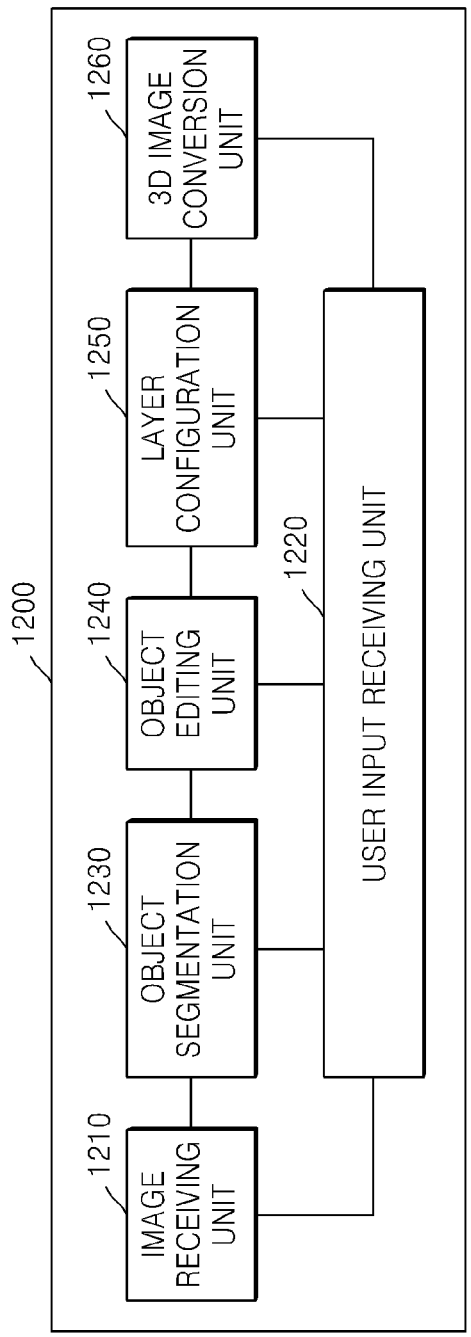
FIG. 12 is a block diagram illustrating an apparatus for creating a 3D image based on user interaction, according to an exemplary embodiment.

FIG. 12 is a block diagram illustrating an apparatus for creating a 3D image based on user interaction, according to an exemplary embodiment.

According to an exemplary embodiment, an apparatus 1200 for creating a 3D image based on user interaction includes an image receiving unit 1210, a user input receiving unit 1220, an object segmentation unit 1230, an object editing unit 1240, a layer configuration unit 1250, and a 3D-image conversion unit 1260. This will be described later by referring to FIGS. 13 through 16.

Figure 13:
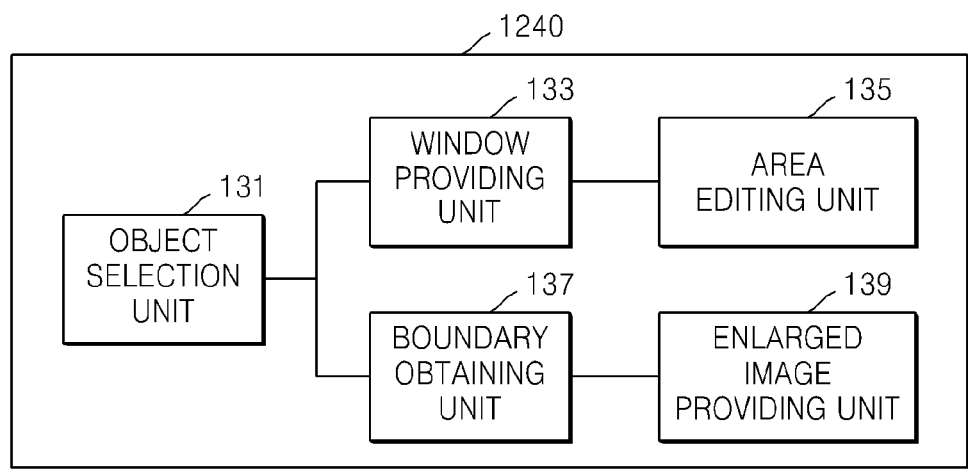
FIG. 13 is a block diagram illustrating an object editing unit, according to an exemplary embodiment.
Figure 14:
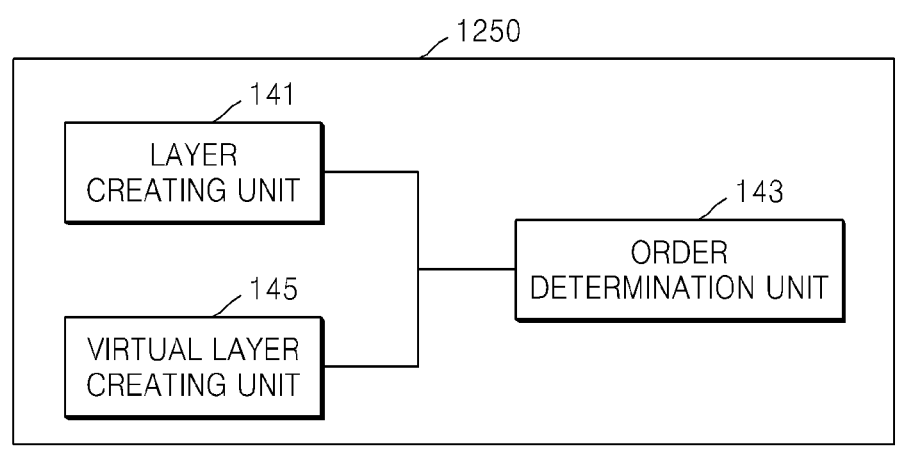
FIG. 14 is a block diagram illustrating a layer configuration unit, according to an exemplary embodiment.
Figure 15:
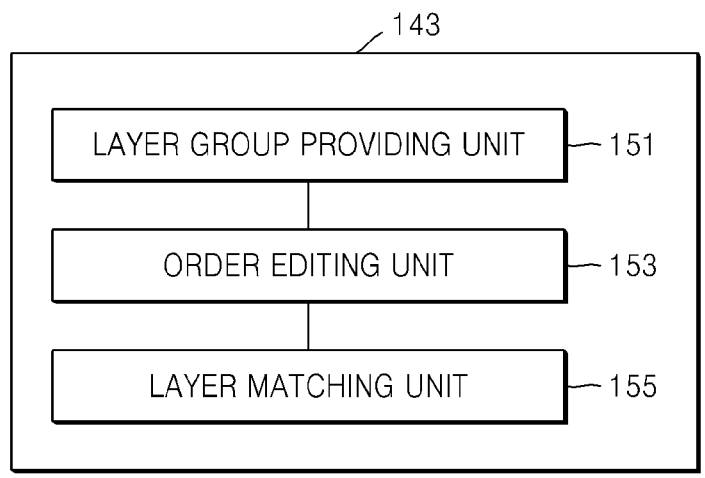
FIG. 15 is a block diagram illustrating an order determination unit, according to an exemplary embodiment.
Figure 16:
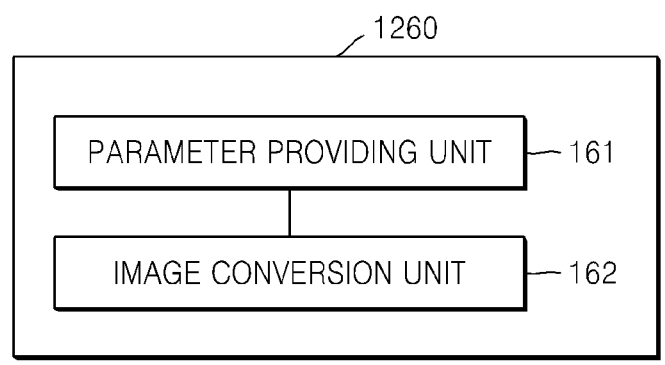
FIG. 16 is a block diagram illustrating a 3D image conversion unit, according to an exemplary embodiment.

FIG. 13 is a block diagram illustrating the object editing unit 1240, according to an exemplary embodiment. FIG. 14 is a block diagram illustrating the layer configuration unit 1250, according to an exemplary embodiment. FIG. 15 is a block diagram illustrating an order determination unit 143, according to an exemplary embodiment of the present invention. FIG. 16 is a block diagram illustrating the 3D image conversion unit 1260, according to an exemplary embodiment.

The image receiving unit 1210 may receive an input image. The input image, according to an exemplary embodiment, may include a plurality of frames.

The user input receiving unit 1220 may receive a user input from a user. The user input is as described above.

The object segmentation unit 1230 may segment an object for remaining frames from among a plurality of frames, based on the at least one frame in which the object is segmented, and display the segmented object in the plurality of frames.

The object editing unit 1240 may include an object selection unit 131 for selecting the segmented object based on a user input obtained from the user input receiving unit 1220, a window providing unit 133 for providing an edit window which includes at least one command for editing an area of the selected object, and an area editing unit 135 for editing the area of the segmented object.

Additionally, the object editing unit 1240 may further include a border obtaining unit 137 for obtaining a border of the segmented object and an enlarged image providing unit 139 for providing a predetermined area, which includes a selected part of the border of the segmented object, as an enlarged image.

The layer configuration unit 1250 may include a layer creating unit 141 for creating a layer for each segmented object in an edited area, and an order determination unit 143 for determining an arrangement order of the created layers. Additionally, the layer configuration unit 1250 may further include a virtual layer creating unit 145 for creating a virtual layer, when a segmented object in the edited area is selected.

The order determination unit 143 may further include a layer group providing unit 151 for providing a plurality of layer groups in which respective created layers are arranged in different orders, an order editing unit 153 for editing the arrangement order of the respective arranged layers based on a user input, and a layer matching unit 155 for determining an arrangement order of the layers by matching the selected object with the virtual layer.

The 3D-image conversion 1260 unit may include a parameter providing unit 161 for providing a parameter value to a segmented object, based on the determined arrangement order of the layers, and an image conversion unit 162 for converting an input image into a 3D image, based on the parameter value.

With regard to the apparatus for creating a 3D image based on user interaction, according to an exemplary embodiment, the description of the method of performing the same may also be applied thereto. Therefore, the description about the apparatus for performing the same will not be provided again here.

The exemplary embodiments may be written as computer programs and may be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While exemplary embodiments have been particularly shown and described, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the exemplary embodiments but by the appended claims, and all differences within the scope will be construed as being included in the present invention.

What is claimed is:

1. A method of creating a three-dimensional (3D) image based on user interaction, the method comprising:
   receiving an input image comprising a plurality of frames;
   receiving a user input for segmenting an object of at least one of the plurality of frames;
   segmenting the object, which is comprised in the input image, based on the received user input;
   selecting the segmented object based on the user input;
   obtaining a border of the segmented object, based on the selection;
   editing an area of the segmented object by editing the obtained border, based on the user input;
   configuring a layer for the segmented object, based on the edited area; and
   creating a 3D image, based on the configured layer,
   wherein the segmenting of the object, which is comprised in the input image, based on the received user input comprises:
      segmenting the object with respect to remaining frames from among the plurality of frames, based on the at least one of the plurality of frames in which the object is segmented; and
      displaying the segmented object in each of the plurality of frames.

2. The method of claim 1, wherein the receiving of the user input for segmenting the object with respect to the at least one of the plurality of frames comprises receiving the user input for segmenting the object with respect to at least one from among a first frame and a last frame from among the plurality of frames, and
   wherein, based on the at least one of the plurality of frames in which the object is segmented, the segmenting of the object with respect to remaining frames from among the plurality of frames comprises segmenting the object with respect to remaining frames from among the plurality of frames based on the at least one from the first frame in which the object is segmented and the last frame in which the object is segmented.

3. The method of claim 1, wherein the editing of the area of the segmented object comprises:
   providing an edit window for editing the area of the selected object;
   selecting a command for editing the area of the selected object, from among at least one command comprised in the edit window; and
   editing the area of the selected object, based on the selected command,
   wherein the at least one command is a command for the segmented object to obtain a different border.

4. The method of claim 1, wherein the editing of the obtained border based on the user input comprises editing the border by receiving a user input of a pre-defined direction, and
   wherein the pre-defined direction comprises at least one from among upward, downward, left, right, and diagonal directions.

5. The method of claim 1, wherein the editing of the obtained border based on the user input comprises:

selecting a part of the border;
providing a predetermined area, which comprises the selected part, as an enlarged image; and
editing the selected part by receiving a user input of a pre-defined direction with regard to the enlarged image,
wherein the pre-defined direction comprises at least one from among upward, downward, left, right, and diagonal directions.

6. The method of claim 1, wherein the configuring of the layer for the segmented object, based on the edited area comprises:
creating layers for respective segmented objects in the edited area; and
determining an arrangement order of the created layers.

7. The method of claim 6, wherein the input image comprises a plurality of objects, and
wherein the creating of the layers for the respective segmented objects in the edited area comprises:
creating layers respectively in correspondence with a plurality of segmented objects in each edited area; and
arranging the respective created layers according to predetermined criteria.

8. The method of claim 7, wherein the predetermined criteria comprise arranging the layers from front to rear on a screen according to an order in which each layer is created.

9. The method of claim 7, wherein the determining of the arrangement order of the created layers comprises editing the arrangement order of the respective arranged layers by receiving a user input of a pre-defined direction, and
wherein the pre-defined direction comprises at least one from among upward, downward, left, right, and diagonal directions.

10. The method of claim 7, wherein the determining of the arrangement order of the created layers comprises:
providing a plurality of layer groups in which layers are arranged in different orders; and
receiving a user input for selecting one of the plurality of layer groups,
wherein the arrangement order of the layers is determined based on the user input.

11. The method of claim 1, wherein the configuring of the layer for the segmented object, based on the edited area comprises:
selecting a segmented object in the edited area;
creating a virtual layer; and
configuring a layer for the segmented object, by matching the selected object with the virtual layer.

12. The method of claim 6, wherein the creating of the 3D image based on the configured layer comprises:
providing a parameter value to the segmented object, based on the determined arrangement order of the layers; and
converting an input image into a 3D image, based on the parameter value.

13. An apparatus of creating a three-dimensional (3D) image based on user interaction, the apparatus comprising:
a display screen;
an image receiver configured to receive an input image comprising a plurality of frames;
a user input receiver configured to receive a user input for segmenting an object of at least one of the plurality of frames;
an object segmenter configured to segment the object displayed on the display screen, which is comprised in the input image, based on the user input;
an object editor comprising an object selector configured to select the segmented object based on the user input obtained from the user input receiver, a border obtainer configured to obtain a border of the segmented object, based on the selection, and an area editor configured to edit an area of the segmented object by editing the obtained border, based on the user input;
a layer configuration unit which configures layers for the segmented object, based on the edited area; and
a 3D-image converter configured to create a 3D image, based on the configured layers,
wherein the object segmenter segments the object with respect to remaining frames from among the plurality of frames, based on the at least one frame in which the object is segmented, and displays a the segmented object in each of the plurality of frames.

14. The apparatus of claim 13, wherein the receiving of the user input for segmenting an object with respect to at least one of the plurality of frames comprises receiving a user input for segmenting an object with respect to at least one from among a first frame and a last frame from among the plurality of frames, and
wherein, based on the at least one frame in which the object is segmented, the segmenting of the object with respect to remaining frames from among the plurality of frames comprises segmenting the object with respect to remaining frames from among the plurality of frames, based on the at least one from among the first frame in which the object is segmented and the last frame in which the object is segmented.

15. The apparatus of claim 13, wherein the object editor comprises:
a window provider configured to provide an edit window for editing an area of the selected object; and
an area editor configured to edit the area of the selected object, based on a selected command from among at least one command comprised in the edit window,
wherein the user input receiver receives a user input for selecting the segmented object, and further receives a user input for selecting a command for editing the area of the selected object, from among the at least one command which is comprised in the edit window, and
wherein the at least one command comprises commands for the segmented object to obtain a different border.

16. The apparatus of claim 13, wherein the area editor edits the border by receiving a user input of a pre-defined direction, and
wherein the pre-defined direction comprises at least one from among upward, downward, left, right, and diagonal directions.

17. The apparatus of claim 13, wherein the user input receiver receives a user input for selecting a part of the border,
wherein the object editor further comprises an enlarged image provider configured to provide a predetermined area, which comprises the selected part, as an enlarged image,
wherein the area editor edits the selected part by receiving a user input of a pre-defined direction for the enlarged image, and
wherein the pre-defined direction comprises at least one from among upward, downward, left, right, and diagonal directions.

18. The apparatus of claim 13, wherein the layer configuration unit further comprises:
a layer creator configured to create layers for each segmented object in the edited area; and
an order determiner configured to determine an arrangement order of the created layers.

19. The apparatus of claim 18, wherein the input image comprises a plurality of objects, wherein the layer creator creates layers respectively in correspondence with a plurality of segmented objects in each edited area, wherein the order determiner arranges the created layers respectively according to predetermined criteria.

20. The apparatus of claim 19, wherein the predetermined criteria comprise arranging the layers from front to rear on a screen according to an order in which the respective layers are created.

21. The apparatus of claim 19, wherein the order determiner further comprises an order editor configured to edit the arrangement order of the respective arranged layers based on a user input of a pre-defined direction, which is received from the user input receiver, and wherein the pre-defined direction comprises at least one from among upward, downward, left, right, and diagonal directions.

22. The apparatus of claim 19, wherein the order determiner further comprises a layer group provider configured to provide a plurality of layer groups in which layers are arranged in different orders, wherein the user input receiver receives a user input for selecting one of the plurality of layer groups, and wherein the arrangement order of the layers is determined based on the user input.

23. The apparatus of claim 13, wherein the layer configuration unit further comprises:

a virtual layer creator configured to create a virtual layer based on the user input received from the user input receiver, when a segmented object in the edited area is selected; and an order determiner configured to determine an arrangement order of created virtual layers, wherein the order determiner further comprises a layer matching unit configured to determine an arrangement order of the virtual layers by matching the selected object with the virtual layer.

24. The apparatus of claim 18, wherein the 3D image converter further comprises:

a parameter provider configured to provide a parameter value to the segmented object, based on the determined arrangement order of the layers; and an image converter configured to convert an input image into a 3D image, based on the parameter value.

25. A non-transitory computer-readable storage medium having stored thereon a computer program that performs the method of claim 1.

26. The method of claim 1, wherein the border is emphasized using at least one from among a dotted line, a solid line, and different colors.

27. The apparatus of claim 13, wherein the border is emphasized using at least one from among a dotted line, a solid line, and different colors.

28. The method of claim 12, wherein the parameter value numerically expresses a viewpoint of a user with respect to the segmented object.

29. The apparatus of claim 24, wherein the parameter value numerically expresses a viewpoint of a user with respect to the segmented object.

* * * * *